United States Patent
Grass et al.

(10) Patent No.: US 9,483,122 B2
(45) Date of Patent: Nov. 1, 2016

(54) OPTICAL SHAPE SENSING DEVICE AND GESTURE CONTROL

(71) Applicant: KONINKLIJKE PHILIPS N.V., Eindhoven (NL)

(72) Inventors: Michael Grass, Buchholz in der Nordheide (DE); Robert Manzke, Bonebuttel (DE); Tobias Klinder, Uelzen (DE); Raymond Chan, San Diego, CA (US)

(73) Assignee: Koninklijke Philips N.V., Eindhoven (NL)

( * ) Notice: Subject to any disclaimer, the term of this patent is extended or adjusted under 35 U.S.C. 154(b) by 2 days.

(21) Appl. No.: 14/398,497

(22) PCT Filed: May 2, 2013

(86) PCT No.: PCT/IB2013/053479
§ 371 (c)(1),
(2) Date: Nov. 3, 2014

(87) PCT Pub. No.: WO2013/168056
PCT Pub. Date: Nov. 14, 2013

(65) Prior Publication Data
US 2015/0109196 A1 Apr. 23, 2015

Related U.S. Application Data

(60) Provisional application No. 61/645,097, filed on May 10, 2012.

(51) Int. Cl.
*G06F 3/01* (2006.01)

(52) U.S. Cl.
CPC .............. *G06F 3/017* (2013.01); *G06F 3/011* (2013.01); *G06F 3/014* (2013.01)

(58) Field of Classification Search
CPC ......... G06F 3/011; G06F 3/014; G06F 3/017
See application file for complete search history.

(56) References Cited

U.S. PATENT DOCUMENTS

| 5,668,573 | A | * | 9/1997 | Favot | G06F 3/011 345/156 |
|---|---|---|---|---|---|
| 5,911,036 | A | | 6/1999 | Wright et al. | |
| 6,437,771 | B1 | * | 8/2002 | Rosenberg | G09B 23/28 345/156 |
| 6,498,652 | B1 | * | 12/2002 | Varshneya | A61B 5/113 356/477 |
| 6,816,266 | B2 | * | 11/2004 | Varshneya | A61B 5/113 356/477 |
| 7,400,408 | B2 | * | 7/2008 | Drabarek | G01B 9/02057 356/479 |
| 7,492,367 | B2 | * | 2/2009 | Mahajan | A63F 13/10 341/20 |
| 9,304,018 | B2 | * | 4/2016 | Davis | G01D 5/3538 |
| 2002/0087101 | A1 | | 7/2002 | Barrick et al. | |
| 2003/0095263 | A1 | * | 5/2003 | Varshneya | A61B 5/113 356/477 |
| 2003/0208289 | A1 | * | 11/2003 | Ben-Arie | G06F 3/011 700/61 |
| 2006/0013523 | A1 | * | 1/2006 | Childlers | A61B 1/00165 385/12 |
| 2006/0202997 | A1 | * | 9/2006 | LaValley | A63F 13/10 345/473 |

(Continued)

FOREIGN PATENT DOCUMENTS

| CA | 2200117 A1 | 9/1998 |
|---|---|---|
| EP | 0211984 A1 | 3/1987 |
| WO | 2008042219 A2 | 4/2008 |

*Primary Examiner* — Gene W Lee

(57) ABSTRACT

The present invention relates to devices, system and method for detecting gestures. The devices, systems and methods uses optically shape sensing devices for tracking and monitoring users. This allows unhindered, robust tracking of persons in different setting. The devices, systems and methods are especially useful in health care institutions.

11 Claims, 3 Drawing Sheets

(56) References Cited

U.S. PATENT DOCUMENTS

| | | | |
|---|---|---|---|
| 2006/0205565 A1* | 9/2006 | Feldman | A63B 23/12 482/8 |
| 2006/0238771 A1* | 10/2006 | Drabarek | G01B 9/02057 356/479 |
| 2006/0267932 A1* | 11/2006 | Rosenberg | G09B 23/28 345/156 |
| 2007/0273648 A1* | 11/2007 | Fussinger | G06F 1/1626 345/161 |
| 2008/0221488 A1 | 9/2008 | Kurono et al. | |
| 2009/0054067 A1 | 2/2009 | Gauthier | |
| 2009/0066641 A1* | 3/2009 | Mahajan | A63F 13/10 345/156 |
| 2010/0013812 A1* | 1/2010 | Gu | G06F 3/014 345/207 |
| 2011/0157016 A1 | 6/2011 | Chang | |
| 2013/0109957 A1* | 5/2013 | 'T Hooft | A61B 1/00082 600/424 |
| 2013/0150732 A1* | 6/2013 | Manzke | A61B 17/00234 600/478 |
| 2013/0301031 A1* | 11/2013 | Manzke | A61B 5/065 356/32 |
| 2013/0308137 A1* | 11/2013 | Manzke | A61B 19/5244 356/511 |
| 2013/0325387 A1* | 12/2013 | Manzke | G01B 11/18 702/97 |
| 2014/0052241 A1* | 2/2014 | Harks | A61B 19/5244 623/2.11 |
| 2014/0088413 A1* | 3/2014 | Von Bucsh | A61B 5/0084 600/424 |
| 2014/0357988 A1* | 12/2014 | Grass | G01T 1/161 600/424 |
| 2015/0124266 A1* | 5/2015 | Davis | G01D 5/3538 356/601 |

* cited by examiner

OPTICAL SHAPE SENSING DEVICE AND GESTURE CONTROL

CROSS-REFERENCE TO PRIOR APPLICATIONS

This application is the U.S. National Phase application under 35 U.S.C. §371 of International Application Serial No. PCT/IB2013/053479, filed on May 2, 2013, which claims the benefit of U.S. Provisional Application Ser. No. 61/645,097, filed on May 10, 2012. These applications are hereby incorporated by reference herein.

FIELD OF THE INVENTION

The present invention relates to gesture control systems and methods. Especially the present invention relates to gesture control systems and method for use in health care institutions.

BACKGROUND OF THE INVENTION

Interacting with computers can be done in a number of ways, including using a mouse or keyboard. In some situations, however, it is preferable to use a touch-free control unit. Such a control system could be a voice controlled system, but voice control is not always sufficiently accurate and precise. The inventor of the present invention has appreciated that an improved control system and method is of benefit, and has in consequence devised the present invention.

SUMMARY OF THE INVENTION

Robustness of systems for controlling imaging systems and other medical devices using operator gestures depends on the volume of sensor data and the type of sensor. Current gesture control methods have drawbacks, e.g., a camera-based system needs a line-of-sight and an ultrasound based system is useful only for short range. Another limiting factor is that for most sensor approaches, it is difficult to track, for example, an operator's entire arm.

The present invention proposes a garment enabled with optical shape sensing that tracks, amongst other things, extremities of an operator, e.g. arms, head, hands, fingers, or any optical shape sensing enabled device, preferably in combination with a system, wherein a pattern recognition scheme is applied to evaluate the recorded gestures for event detection in real-time.

It would be advantageous to achieve a control system where touch-free control allows precise and robust inputs to a device, e.g. a computer.

In general, the invention preferably seeks to mitigate, alleviate or eliminate one or more of the above mentioned disadvantages singly or in any combination. In particular, it may be seen as an object of the present invention to provide a method that solves the above mentioned problems, or other problems, of the prior art.

To better address one or more of these concerns, in a first aspect of the invention a garment to be worn by a person, e.g. a health care person, to be monitored is presented that comprises an optical shape sensing device affixed to and running throughout the garment so that shape changes and/or movement of a part of the garment is reflected as a shape change in the optical shape sensing device, wherein the optical shape sensing device is sewed up in, or affixed to, the garment so as to monitor motion.

By utilizing a garment having a trackable shape sensing device embedded or affixed to the garment the drawbacks of a camera-based system needing a line-of-sight and an ultrasound-based system being useful for short range only, are eliminated. Another limiting factor which is overcome is that for most sensor approaches, it is difficult to track, for example, an operator's entire arm. By the present invention it is possible to track an entire arm. This allows for a more precise recognition of gestures. Further, it is contemplated that gesture commands may include movement of more parts of the arm, e.g. combined by upper and lower arm and/or hand. The garment allows monitoring of a person wearing the garment in a robust way. The garment provides possibility of recognition of movement patterns of the person wearing the garment whereby the person is allowed to interact with equipment in a touch-free way.

Using the garment, or the instrument, it is possible to control a range of equipment including, but not limited to, an imaging system, e.g. allowing the wearer to change or manipulate images being displayed, a surgical instrument, for instance a catheter or interventional or surgical probe or robot or an injector for contrast agent, a data set being displayed on a screen or any other instrument or equipment that a surgeon may wish to operate in an easy and intuitive manner without having to touch the device to control it. More examples will be given below.

The present invention may also include audio and/or visual and/or haptic feedback to confirm gesture interpretation and command execution. Further, the system, garment, instrument and method may employ a mode switch so as to toggle gesture control state on and off during an intervention. Also a confirmation step may be used before a recognized command is executed.

When using the garment in a health care institution, especially in a surgical setting, the garment provides intuitive control, and improved workflow due to reduced interaction with the clinical staff handling viewing workstations. It is currently imagined that the system is well suited for examples in medical imaging which in general includes image browsers controlled by gestures. This could e.g. be prerecorded pre-interventional imaging including but not limited to CT, MR, X-ray, Ultrasound imaging or live X-ray images, MR-images, CT images, ultra sound images of a patient undergoing, or scheduled to undergo, surgery or other medical procedure.

In an embodiment the optical shape sensing device comprises a flexible body having a cross-section being comparatively small relative to the length of the device, the optical shape sensing device configured to determine the shape of the flexible body relative to a reference, the shape sensing device configured to collect information based on its configuration to track movement and/or current shape of the flexible body. When the optical shape sensing device comprises a flexible body, the optical shape sensing device is able to follow the movements of the person wearing the garment while having an increased strength.

Advantageously the optical shape sensing device is integrated in a part of the garment corresponding to an extremity of a person wearing the garment. As mentioned above it is contemplated to be especially useful to integrate the optical shape sensing device in an extremity as these are the most efficient to move purposely. Extremities include arms, head, hands and/or one or more fingers. Tracking the torso of a person alone could yield detection of unintended movement patterns corresponding to a given command or event. Combining movement pattern recognition of torso and one or more extremities provides a wider range of combination s allowing more commands or events to be defined. Tracking at least one extremity allow for an intuitive control of the device to be controlled.

In an embodiment the garment is a surgical gown and the optical shape sensing device is located in one arm of the surgical gown. The integration of the optical shape sensing device in a garment for use in surgical gowns is especially useful as in such settings the need for reducing contact to maintain sterility is quite high. Eliminating contact between the surgeon and any equipment reduces the risk of contamination, e.g. from insufficient cleaning of the equipment.

Advantageously the garment may comprise a connector for connecting the optical shape sensing device to a control computing device generating gesture events based on position information from the optical shape sensing device. The garment is advantageously used for generating commands or instructions for a computing device, e.g. an imaging device for use in a surgical setting.

A second aspect relates to a surgical instrument comprising an optical shape sensing device disposed within the surgical instrument and configured to determine a shape and/or position of the surgical instrument relative to a reference, the optical shape sensing device configured to collect information based on its configuration to during a procedure. Gestures may be detected based on detecting maneuvers of tracked medical devices, such as surgical instruments including but not limited to a shape sensing enabled catheter, which for instance could be used to trigger an infusion if the physician performs specific actions. An example could be a clockwise rotation by 180 degrees or fast movements detectable by applying pattern recognition. The optical shape sensing device may in this relation also be an optical position sensing device.

Advantageously the surgical instrument may be a flexible instrument including a catheter and/or a guidewire.

In an embodiment the surgical instrument may comprise a connector for connecting to a control computing device generating gesture events based on position information from the optical shape sensing device. The surgical instrument may be connected directly to a control computing device performing gesture pattern recognition or be connected to a garment according to the first aspect of the present invention so that a system for pattern recognition correlates patterns recorded for the surgical instrument with patterns detected using the garment.

A third aspect of the present invention relates to a gesture pattern recognition system comprising a garment to be worn by a human to be monitored, the garment comprising: an optical shape sensing device affixed to and running throughout the garment so that shape changes and/or movement of a part of the garment is reflected as a shape change in the optical shape sensing device, wherein the optical shape sensing device is sewed up in, or affixed to, the garment so as to monitor motion, the shape gesture pattern recognition system receiving a signal from the optical shape sensing device and the shape gesture pattern recognition system generating a gesture event based on the signal from the optical shape sensing device. The optical shape sensing device allow for tracking of movement of the person wearing the garment and the system as a whole may then be used for monitoring if/when the person wish to issue a command or instruction to a computing device, such as an image display device. The system provides accurate and robust monitoring of movement without limitations of line of sight.

A fourth aspect of the present invention relates to a gesture pattern recognition system comprising a surgical instrument comprising an optical shape sensing device disposed within the surgical instrument and configured to determine a shape and/or position of the surgical instrument relative to a reference, the optical shape sensing device connected to the shape gesture pattern recognition system to collect information based on a signal from the optical shape sensing device relating to the configuration of the instrument to during a procedure, the shape gesture pattern recognition system creating gesture events based on the signal. The optical shape sensing device is used for monitoring movement of the surgical instrument. The person operating the surgical instrument may wish to issue a command to create a gesture event. As an example a shape sensing enabled catheter could be used to trigger an infusion if the physician performs specific actions such as clockwise rotation by 180 degrees or fast movements detectable by using a system according to the applying pattern recognition A fifth aspect of the present invention relates to a method for controlling a shape gesture pattern recognition system comprising an object with an optical shape sensing device, wherein the shape gesture pattern recognition system is configured to determine a shape and/or position of the object relative to a reference, the method comprising the steps of detecting a gesture pattern of the object, determining if the gesture pattern of the object corresponds to one of a set of recognized gestures, if the gesture pattern is recognized generating a gesture event based on the recognized gesture, and operating a device based on the gesture event. The method allows monitoring of a person wearing a garment having an optical shape sensing device. The method provides recognition of movement patterns of the person wearing the garment whereby the person is allowed to interact with equipment in a touch-free way. The method may advantageously be used in connection with the devices and systems mentioned in relation to the other aspects of the present invention.

Advantageously the object is a garment and the optical shape sensing device is integrated or affixed to the garment, the method may then comprise detecting gesture patters of the person wearing the garment. The gesture patterns are used for generating gesture events which in turn is used for controlling a device. The device could be an imaging device as described elsewhere.

Advantageously when the object is a surgical instrument comprising an optical shape sensing device disposed within the surgical instrument and configured to determine a shape and/or position of the surgical instrument relative to a reference, the optical shape sensing device may be configured to collect information based on its configuration to during a procedure. When applying the method to a surgical instrument the method allows the operator of the instrument to issue touch-free commands. The commands could relate to a shape sensing enabled catheter to trigger an infusion via the catheter.

Advantageously detecting the gesture pattern may include detecting discrete events and/or quantitative metrics including velocity and/or acceleration. By applying discrete events, e.g. detecting that an arm moves in a specific manner or movement pattern of a hand, the method allows definition of movements that are not usually part of the operators normal behavior. The same apply to detection of quantitative metrics.

Advantageously detecting discrete events may include detecting motion of extremities of a person wearing the object. As mentioned the method may advantageously focus on the movement of an extremity, or several extremities, e.g. arm, leg, hand, finger, head or combinations thereof.

In all of the above aspects the following may apply to the optical shape sensing device.

Advantageously the optical shape sensing device may include an optical fiber having at least one of Fibre Bragg Gratings (FBGs) and/or a Rayleigh scatter interrogation setup for sensing strain in the fibre. The use of optical fibre or optical fibres allow for the device to be flexible. Other suitable materials or structures may be envisioned.

Advantageously the optical shape sensing device includes an area of higher sensitivity by including an area with a higher number of optical fibres having optical strain sensors. E.g. optical shape sensing device may have one area where one number of optical fibres having optical strain sensors are present, in another are another number of optical fibres having optical strain sensors is present, and thus an area having of higher sensitivity may be established. The higher sensitivity may help achieve a better resolution on the determination of the position of the device. It may be advantageous to have an area having one optical fibre having optical strain sensors defining an area having a first sensitivity, and another area having four optical fibres having optical strain sensors defining an area having a second sensitivity being higher than the first sensitivity.

Advantageously the optical shape sensing device may include one, or more, of a spiral shape, a ring shape, a straight or curved line and/or a loop shape. The different devises provide different effects e.g. better fitting to a specific organ and/or tumour, and the specific choice may depend on the intended clinical application.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Gesture control is gaining attention in the medical market due to advantages such as touch-free control, which is important for maintaining sterility, intuitive control, improved workflow and the like. Gesture control robustness, however, depends on the amount of sensor data and the type of sensor: e.g a camera-based system suffers line-of-sight issues. That is to say, the camera must have an unobstructed view on the tracked object, e.g. the arm or hand of a person. An ultrasound based system is useful only for short range applications. For most sensor approaches it is difficult to track, for example, the entire arm of an operator.

Figure 1:
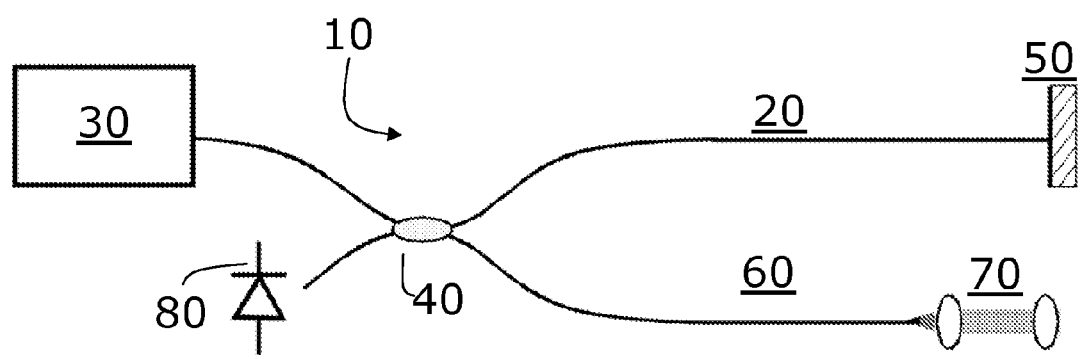
FIG. 1 is a schematic illustration of a principle used in the present invention.

FIG. 1 schematically illustrates one principle used in the present invention where an optical fiber is used as an optical shape sensing device. In practice, optical fiber 20 may be any type of optical fiber suitable for optically tracking an elongated device. Examples of optical fiber 20 include, but are not limited to, a flexible optically transparent glass or plastic fiber incorporating an array of fiber Bragg gratings integrated along a length of the fiber as known in the art, and a flexible optically transparent glass or plastic fiber having naturally variations in its optic refractive index occurring along a length of the fiber as known in the art (e.g., a Rayleigh scattering based optical fiber). Optical fiber 20 may be a single core fiber or preferably, a multi-core fiber.

Overall FIG. 1 schematically illustrates the principles of a system 10 for optical frequency domain reflectometry using a tuneable light source 30 and a fiber-optic interferometer. The output of the light source 30 travels through a splitter 40 which directs a part of the signal into a reference arm 50 and the remaining part of the signal into a sample arm 60 which illuminates and receives the light reflected at the area 70.

The interference between the signal returned from the reference arm and the signal returned from the sample-arm is detected with a square-law photo detector 80 while the wavelength of the monochromatic source is swept and the path lengths of the reference and sample arm are held constant. The axial reflectivity profile (A-line) is obtained by discrete Fourier transform (DFT) of the sampled detector signals.

In practice, elongated device 20 may be any type of device suitable for embedding an optical fiber therein for purposes of optically tracking the elongated device. Examples of elongated device 20 include, but are not limited to, an endoscope of any type, a catheter and a guide wire. Further the elongated device 20 may be embedded or attached to a garment.

In practice, optical interrogation console 30, including the light source, may be any device or system structurally configured for transmitting light to optical fiber 20 or 60 and receiving reflected light from optical fiber 20 or 60. In one embodiment, optical interrogation console 30 employs an optical Fourier domain reflectometer and other appropriate electronics/devices as known in the art.

Figure 2:
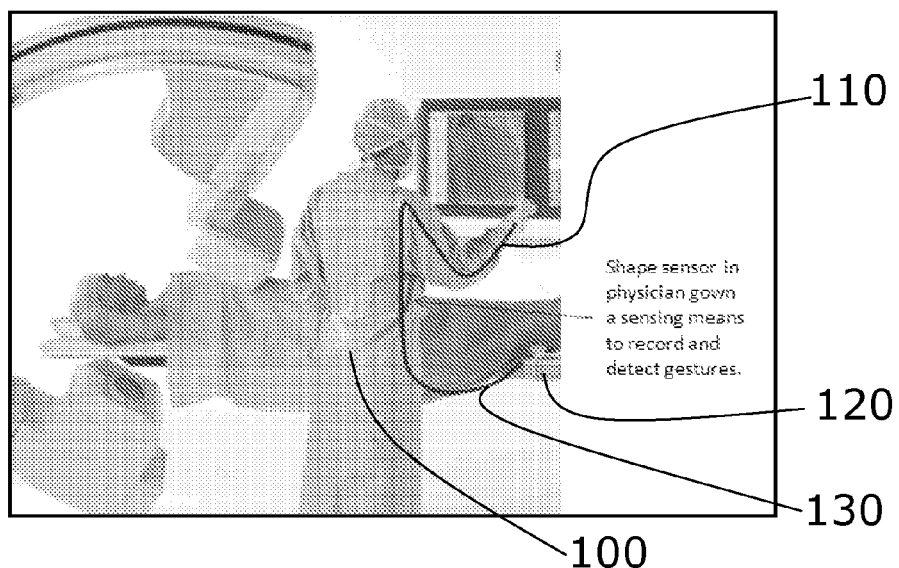
FIG. 2 is a schematic illustration of a health care setting.

FIG. 2 schematically illustrates a garment 100 worn by a health care person to be monitored. The garment 100 comprises an optical shape sensing device 110 affixed to and running throughout the garment 100 so that shape changes and/or movement of a part of the garment 100 is reflected as a shape change in the optical shape sensing device 110, wherein the optical shape sensing device 110 is sewed up in, or affixed to, the garment 100 so as to monitor motion. This allows unobstructed monitoring of the person using the garment 100 whereby detection of specific movement patterns is possible. In FIG. 2 the garment 100 is a surgical gown and the optical shape sensing device 110 is located in one arm of the surgical gown.

Fiber-optic shape sensing 110 when contained in a flexible substrate such as textile of a garment can be used to track gestures of an operator wearing the sensing enabled garment. If the shape sensor is embedded e.g. in the arm sleeve of the operating apron, the entire arm can be tracked without any sensor limitation such as line-of-sight, or operating field size.

The relative accuracy of Optical Shape Sensing (OSS) is good enough even at extended tether lengths of more than three meters for gesture control and movement pattern recognition, allowing for enough cable length to connect garment 100. The garment 100 may be connected to equipment via the operating table 120 or directly to a control system. Preferably the connection is via a cable 130 as there may be risks involved when using a wireless connection, but it is not excluded that the garment 100, or optical shape sensing device 110, may be connected wirelessly.

Another advantage of optical shape sensing especially compared to the more established Time Of Flight (TOF) technology is that even small deformation can be tracked. This is particularly important as one current problem of TOF based gesture control is that large movements have to be performed to do the control which is difficult to accept in the operating room. This is not always desirable in operating theaters.

The optical shape sensing device 110 comprises a flexible body having a cross-section being comparatively small relative to the length of the device, and the optical shape sensing device 110 is configured to determine a shape of flexible body relative to a reference, the shape sensing device 110 configured to collect information based on its configuration to track movement and/or current shape of the flexible body. This is also possible via the arrangement illustrated in FIG. 1.

Figure 3:
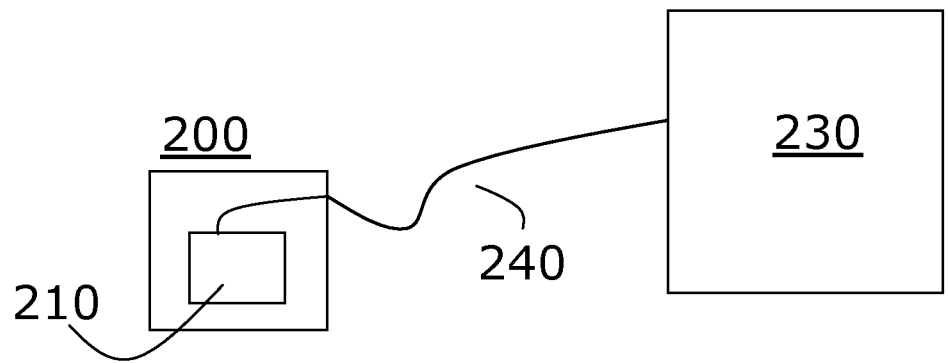
FIG. 3 is a schematic illustration of a system including a surgical instrument.

Gestures can also be detected based on detecting maneuvers of tracked medical devices. E.g. a shape sensing enabled catheter could be used to trigger an infusion if the physician performs specific actions such as clockwise rotation by 180 degrees or fast movements detectable by applying pattern recognition approaches. FIG. 3 is a schematic illustration of a surgical instrument 200 comprising an optical shape sensing device 210 disposed within the surgical instrument 200 and configured to determine a shape and/or position of the surgical instrument 200 relative to a reference, the optical shape sensing device 200 configured to collect information based on its configuration to during a procedure.

In an advantageous embodiment the surgical instrument 200 is a flexible instrument including a catheter and/or a guidewire. Such instruments are commonly used by surgeons and the added feature of being able to control functions of the instrument without having to let go of the instrument is an improvement of the safety when operating.

As with the garment 100, the surgical instrument 200 further comprises a connector for connecting to a control computing device 230 generating gesture events based on position information from the optical shape sensing device. Preferably the instrument 200 is connected to a system via a cable 240.

For further improvement of safety is it possible to restrict the system so that the shape sensing 210 can be used for identification purposes: e.g. only when the tracked hand of the interventional cardiologist holds the end of a tracked ablation catheter the ablation procedure can be activated while all other personnel touching the catheter cannot activate it.

Figure 4:
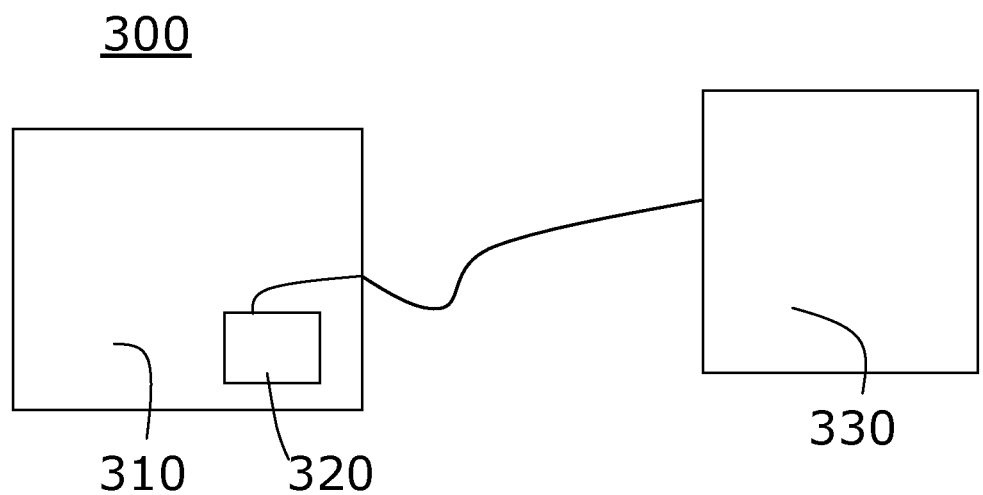
FIG. 4 is a schematic illustration of a system including a garment.

FIG. 4 schematically illustrates a gesture pattern recognition system 300 comprising a garment 310 to be worn by a human to be monitored, the garment 310 comprising an optical shape sensing device 320 affixed to and running throughout the garment 310 so that shape changes and/or movements of a part of the garment 310 are reflected as shape changes in the optical shape sensing device 320, wherein the optical shape sensing device 320 are sewed up in, or affixed to, the garment 310 so as to monitor motion, the shape gesture pattern recognition system 300 comprising a processor 330 receiving a signal from the optical shape sensing device 320 and the shape gesture pattern recognition system 300 generating a gesture event based on the signal from the optical shape sensing device 320.

The system is especially suitable for use in a surgical room setting. The optical shape sensing device 320 allows for tracking of movement of the person wearing the garment 310 and the system as a whole may then be used for monitoring if/when the person wishes to issue a command or instruction to a computing device, such as an image display device. The system 300 provides accurate and robust monitoring of movement without limitations of line of sight.

A similar system may be defined, with reference FIG. 3, wherein a surgical instrument 200 comprising an optical shape sensing device 210 disposed within the surgical instrument 200 and configured to determine a shape and/or position of the surgical instrument 200 relative to a reference, is used. The optical shape sensing 210 device is then connected 240 to a processor 230 in the shape gesture pattern recognition system to collect information based on a signal from the optical shape sensing device 210 relating to the configuration of the instrument 200 to during a procedure, the shape gesture pattern recognition system creating gesture events based on the signal. The person using the system may then issue commands to the pattern recognition system so as to operate further functions in the instrument or an external system such as an image viewing system.

Figure 5:
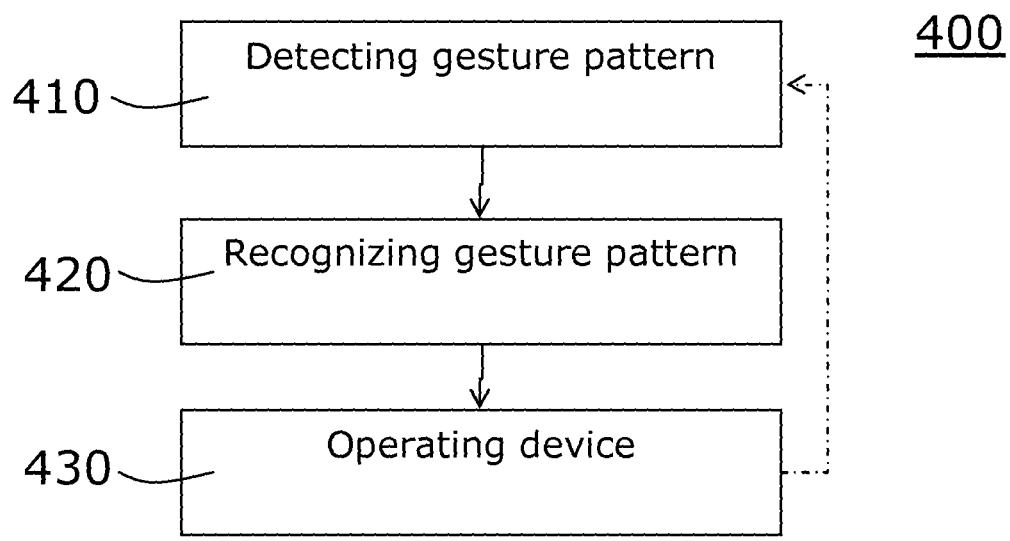
FIG. 5 is a schematic illustration of steps of a method according to the present invention.

FIG. 5 schematically illustrates steps of a method 400 for controlling a gesture pattern recognition system comprising an object with an optical shape sensing device, wherein the shape gesture pattern recognition system is configured to determine a shape and/or position of the object relative to a reference, the method comprising the steps of detecting 410 a gesture pattern of the object, determining 420 if the gesture pattern of the object corresponds to one of a set of recognized gestures, if the gesture pattern is recognized generating a gesture event based on the recognized gesture, and operating 430 a device based on the gesture event.

The method may be used in connection with a garment 310 and the optical shape sensing device 320 is then integrated or affixed to the garment 310, the method may then further comprise detecting gesture patters of the person wearing the garment.

Alternatively the method 400 may be used in connection with a surgical instrument 200 comprising an optical shape sensing device 210 disposed within the surgical instrument and configured to determine a shape and/or position of the surgical instrument relative to a reference, the optical shape sensing device configured to collect information based on its configuration to during a procedure.

All embodiments described herein may further comprise a further step or device for initiating the gesture control. This could e.g. be a voice recognition system for detecting when an intended command is to be issued by the person wearing the garment or operating the instrument. This allows for improved security as the system or method will not misinterpret movements not related to a command as actual commands.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advan-

The invention claimed is:

1. A garment to be worn by a person to be monitored, the garment comprising:
an optical shape sensing device integrated in and running throughout at least a part of the garment so that shape changes and/or movement of the part of the garment is reflected as a shape change in the optical shape sensing device, wherein the optical shape sensing device is integrated in the garment so as to monitor motion, wherein the optical shape sensing device comprises (i) an optical fiber reference arm for receiving a part of a light signal output from a monochromatic light source through a splitter, (ii) an optical fiber sample arm for receiving a remaining part of the light signal, wherein the sample arm Illuminates and receives light reflected at a distal area of the sample arm, and (iii) a flexible body having a cross-section being comparatively small relative to the length of the optical shape sensing device,
the optical shape sensing device being configured to determine a shape of flexible body relative to a reference, based on an interference between a part of the light signal returned from the reference arm and a remaining part of the light signal returned from the sample arm detected with a square-law photo detector while a wavelength of the monochromatic light source Is swept and path lengths of the reference arm and sample arm are held constant, the optical shape sensing device further being configured to collect information based on its configuration to track movement and/or current shape of the flexible body; and
a connector for connecting the optical shape sensing device to a control computing device generating gesture events based on position information from the optical shape sensing device.

2. The garment according to claim 1, wherein the optical shape sensing device is integrated in a part of the garment corresponding to an extremity of a person wearing the garment.

3. The garment according to claim 1, wherein the garment is a surgical gown and the optical shape sensing device is located in one arm of the surgical gown.

4. A surgical instrument comprising:
an optical shape sensing device disposed within the surgical instrument and configured to determine a shape and/or position of the surgical instrument relative to a reference,
wherein the optical shape sensing device comprises (i) an optical fiber reference arm for receiving a part of a light signal output from a monochromatic light source through a splitter, (ii) an optical fiber sample arm for receiving a remaining part of the light signal, wherein the sample arm illuminates and receives light reflected at a distal area of the sample arm, and (iii) a flexible body having a cross-section being comparatively small relative to the length of the optical shape sensing device,
wherein the optical shape sensing device is configured to determine a shape of flexible body relative to the reference based on an interference between a part of the light signal returned from the reference arm and a remaining part of the light signal returned from the sample arm detected with a square-law photo detector while a wavelength of the monochromatic light source is swept and path lengths of the reference arm and sample arm are held constant, and
wherein the optical shape sensing device is further configured to collect information based on its configuration during a procedure, further comprising:
a connector for connecting to a control computing device generating gesture events based on position information from the optical shape sensing device.

5. A shape gesture pattern recognition system comprising:
a garment to be worn by a human to be monitored, wherein the garment comprises
an optical shape sensing device integrated in and running throughout at least a part of the garment so that shape changes and/or movement of the part of the garment is reflected as a shape change in the optical shape sensing device, wherein the optical shape sensing device is integrated in the garment so as to monitor motion; and
a processor receiving a signal from the optical shape sensing device and generating a gesture event based on the signal from the optical shape sensing device, wherein the optical shape sensing device comprises (i) an optical fiber reference arm for receiving a part of a light signal output from a monochromatic light source through a splitter, (ii) an optical fiber sample arm for receiving a remaining part of the light signal, wherein the sample arm illuminates and receives light reflected at a distal area of the sample arm, and (iii) a flexible body having a cross-section being comparatively small relative to the length of the optical shape sensing device,
the optical shape sensing device being configured to determine a shape of flexible body relative to a reference, based on an interference between a part of the light signal returned from the reference arm and a remaining part of the light signal returned from the sample arm detected with a square-law photo detector while a wavelength of the monochromatic light source is swept and path lengths of the reference arm and sample arm are held constant, the optical shape sensing device further being configured to collect information based on its configuration to track movement and/or current shape of the flexible body.

6. A shape gesture pattern recognition system comprising:
a surgical instrument that comprises an optical shape sensing device disposed within the surgical instrument, wherein the optical shape sensing device comprises (i) an optical fiber reference arm for receiving a part of a light signal output from a monochromatic light source through a splitter, (ii) an optical fiber sample arm for receiving a remaining part of the light signal, wherein the sample arm illuminates and receives light reflected at a distal area of the sample arm, and (iii) a flexible body having a cross-section being comparatively small relative to the length of the optical shape sensing device, the optical shape sensing device being configured to determine a shape and/or position of the surgical instrument relative to a reference based on an interference between a part of the light signal returned from the reference arm and a remaining part of the light signal returned from the sample arm detected with a square-law photo detector while a wavelength of the monochromatic light source is swept and path lengths of the reference arm and sample arm are held constant, wherein further the optical shape sensing device is connected to a processor in the shape gesture pattern recognition system to collect information based on a signal from the optical shape sensing device relating to the configuration of the instrument during a procedure, the shape gesture pattern recognition system creating gesture events based on the signal.

7. A method for controlling a shape gesture pattern recognition system that comprises an object with an optical shape sensing device, wherein the shape gesture pattern recognition system is configured to determine a shape and/or position of the object relative to a reference, the method comprising:

detecting, via the shape gesture patter recognition system, a gesture pattern of the object, wherein the optical shape sensing device comprises (i) an optical fiber reference arm for receiving a part of a light signal output from a monochromatic light source through a splitter, (ii) an optical fiber sample arm for receiving a remaining part of the light signal, wherein the sample arm illuminates and receives light reflected at a distal area of the sample arm, and (iii) a flexible body having a cross-section being comparatively small relative to the length of the optical shape sensing device, and wherein the shape gesture pattern recognition system is configured to determine the shape and/or position of the object relative to the reference based on an interference between a part of the light signal returned from the reference arm and a remaining part of the light signal returned from the sample arm detected with a square-law photo detector while a wavelength of the monochromatic light source is swept and path lengths of the reference arm and sample arm are held constant;

determining if the gesture pattern of the object corresponds to one of a set of recognized gestures, if the gesture pattern is recognized generating a gesture event based on the recognized gesture; and operating a device based on the gesture event.

8. The method according to claim 7, wherein the object is a garment and the optical shape sensing device is integrated or affixed to the garment, the method further comprising detecting gesture patterns of the person wearing the garment.

9. The method according to claim 7, wherein the object is a surgical instrument that comprises an optical shape sensing device disposed within the surgical instrument and configured to determine a shape and/or position of the surgical instrument relative to a reference, the optical shape sensing device being configured to collect information based on its configuration during a procedure.

10. The method according to claim 7, wherein detecting the gesture pattern includes detecting discrete events and/or quantitative metrics including velocity and/or acceleration.

11. The method according to claim 10, wherein detecting discrete events includes detecting motion of extremities of a person wearing the object.

* * * * *